(12) United States Patent
Kolditz et al.

(10) Patent No.: US 9,902,834 B2
(45) Date of Patent: Feb. 27, 2018

(54) COMPOSITION FOR THE PRODUCTION OF HYDROPHILIC POLYSTYRENE

(71) Applicants: Pirko Kolditz, Hamburg (DE); Lutz Liebehentschel, Bargteheide (DE)

(72) Inventors: Pirko Kolditz, Hamburg (DE); Lutz Liebehentschel, Bargteheide (DE)

(73) Assignee: CLARIANT INTERNATIONAL LTD., Muttenz (CH)

( * ) Notice: Subject to any disclaimer, the term of this patent is extended or adjusted under 35 U.S.C. 154(b) by 294 days.

(21) Appl. No.: 14/399,804

(22) PCT Filed: Apr. 17, 2013

(86) PCT No.: PCT/EP2013/001139
§ 371 (c)(1),
(2) Date: Nov. 7, 2014

(87) PCT Pub. No.: WO2013/167230
PCT Pub. Date: Nov. 14, 2013

(65) Prior Publication Data
US 2015/0118427 A1 Apr. 30, 2015

(30) Foreign Application Priority Data
May 9, 2012 (EP) .................................. 12003706

(51) Int. Cl.
| | |
|---|---|
| C08K 5/103 | (2006.01) |
| C08L 71/02 | (2006.01) |
| C08L 23/00 | (2006.01) |
| C08L 29/00 | (2006.01) |
| C08L 59/00 | (2006.01) |
| B65D 1/36 | (2006.01) |
| C08K 3/34 | (2006.01) |
| B65D 1/34 | (2006.01) |
| C08L 25/06 | (2006.01) |
| C08J 3/22 | (2006.01) |
| C08J 9/00 | (2006.01) |
| C08L 51/04 | (2006.01) |
| B01F 3/08 | (2006.01) |
| B01J 20/04 | (2006.01) |
| B01J 20/26 | (2006.01) |
| B01J 20/28 | (2006.01) |
| C08K 3/26 | (2006.01) |

(52) U.S. Cl.
CPC ............ C08K 5/103 (2013.01); B01F 3/0803 (2013.01); B01J 20/043 (2013.01); B01J 20/261 (2013.01); B01J 20/262 (2013.01); B01J 20/28014 (2013.01); B65D 1/34 (2013.01); B65D 1/36 (2013.01); C08J 3/226 (2013.01); C08J 9/0023 (2013.01); C08J 9/0061 (2013.01); C08J 9/0066 (2013.01); C08K 3/346 (2013.01); C08L 23/00 (2013.01); C08L 25/06 (2013.01); C08L 29/00 (2013.01); C08L 51/04 (2013.01); C08L 59/00 (2013.01); C08L 71/02 (2013.01); B01F 2215/0049 (2013.01); C08J 2325/06 (2013.01); C08J 2425/06 (2013.01); C08J 2471/02 (2013.01); C08K 2003/265 (2013.01); Y10T 428/1352 (2015.01); Y10T 428/1376 (2015.01); Y10T 428/1386 (2015.01); Y10T 428/1397 (2015.01)

(58) Field of Classification Search
CPC .......... C08L 25/06; C08L 23/00; C08L 29/00; C08L 59/00; C08L 71/02; C08K 3/346; C08K 5/103; B65D 1/34; B65D 1/36; Y10T 428/1352; Y10T 428/1376
See application file for complete search history.

(56) References Cited

U.S. PATENT DOCUMENTS

| | | | | |
|---|---|---|---|---|
| 3,595,425 | A * | 7/1971 | Eicholtz | ............. B65D 21/0223 206/511 |
| 4,048,280 | A | 9/1977 | Spicuzza, Jr. et al. | |
| 4,696,950 | A | 9/1987 | Cox | |
| 2003/0175492 | A1* | 9/2003 | Dames | .................... C08L 59/00 428/304.4 |
| 2015/0087735 | A1 | 3/2015 | Kolditz et al. | |

FOREIGN PATENT DOCUMENTS

EP 2 289 994 3/2011

OTHER PUBLICATIONS

PCT International Report on Patentability for PCT/EP2013/001139, dated Nov. 11, 2014.
U.S.P.T.O. Office Action for U.S. Appl. No. 14/399,812, dated Sep. 9, 2015.
PCT International Search Report for PCT/EP2013/001139, dated Jun. 5, 2013.

* cited by examiner

*Primary Examiner* — Walter B Aughenbaugh
(74) *Attorney, Agent, or Firm* — Anthony A. Bisulca

(57) ABSTRACT

The invention relates to a composition Z comprising a component B, a component C, a component D, a component E and a component P, wherein
the component B is a polyethylene glycol,
the component C is a polyglycerol ester,
the component D is an earth alkali carbonate,
the component E is a phyllosilicate,
and the component P is a polystyrene and/or an alloy thereof.
Composition Z is suitable to increase the hydrophilic properties of processed solid or foamed polystyrene material, especially for making a film, sheet or food tray.

16 Claims, 1 Drawing Sheet

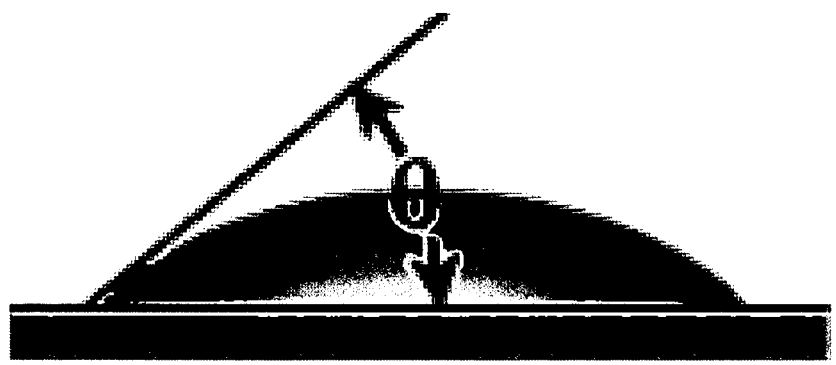
Static contact angle Theta

COMPOSITION FOR THE PRODUCTION OF HYDROPHILIC POLYSTYRENE

The invention relates to a composition in the joint extrusion with polystyrene in order to increase the hydrophilic properties of a processed solid non-foamed or foamed polystyrene material.

Solid non-foamed or foamed polystyrene is widely used as suitable material for making trays for packaging food, such as meat, fish, vegetables or fruits. These foods being packed in trays usually release water, juice or blood which fills the inside of the packaged tray. From hygienically and visual standpoint it is highly desirable to rapidly absorb these liquids, preferably by a tray material having suitable adsorptive properties.

In the plastics industry it is customary to use additives in the form of Compounds or masterbatches.

For the purposes of the invention, masterbatches are compositions comprising a polymer and the additive, in which the additive is present in higher concentrations than in the final application and the carrier polymer may or may not be the polymer of the final application. Preferred concentrations of the additives in a masterbatch range of from 0.1 to 90% by weight, in particular of from 1 to 80% by weight, especially of from 10 to 75% by weight, based on the total weight of the masterbatch.

For the purposes of the invention, Compounds are compositions comprising a polymer and the additive, in which the additive is present in the desired final concentration of the final application or final article and the polymer is the desired polymer of the final application or final article, so that the Compound is merely brought to the desired shape of the final application or final article by means of a physical shaping process.

Masterbatches and/or Compounds which contain hydrophilic additives and are used for producing hydrophilic compositions or articles have to satisfy demanding requirements: the compositions should have a high loading, i.e. a high concentration of the hydrophilic additives, and it should be possible to set the desired contact angle between the polymer surface and water in the final article. Further requirements are good miscibility and compatibility with the polymer of the final application or the final article. Additionally, a high absorption of water or meat juice in foamed polystyrene food trays is wanted. A measurable variable for the absorptive properties of a polystyrene surface for aqueous liquids is the surface angle (static contact angle) of the polystyrene surface to water. The lower the surface angle, the higher is the absorptive property.

EP 2 289 994 A2 discloses an absorbent masterbatch chip composition for a polystyrene foam tray, wherein the masterbatch chips comprise an organic anionic sulphonate, calcium carbonate and talc.

The known compositions, however, do not satisfy all present-day requirements of industry, especially their absorptive properties are not sufficient. There is a need for masterbatches and Compounds containing hydrophilic additives which provide for a low static contact angle and are still compatible with the polymeric material with respect to formability and mechanical stability, e.g. density, stiffness and tear strength.

It was found that the following composition Z comprising a polystyrene and a particular mixture of hydrophilic additives surprisingly displays improved properties as to the before described demands.

BRIEF DESCRIPTION OF THE DRAWING

FIG. 1 is a graphical representation of the static contact angle Theta.

Subject of the invention is a composition Z comprising a component B, a component C, a component D, a component E and a component P, wherein
- the component B is a polyethylene glycol,
- the component C is a polyglycerol ester,
- the component D is an earth alkali carbonate,
- the component E is a phyllosilicate,
- and the component P is a polystyrene and/or an alloy thereof.

According to the present invention, composition Z is suitable to enhance the hydrophilicity of polystyrene which means to provide for a polystyrene material which is modified by the particular additives as per the invention in order to obtain a lower static contact angle between the polymer surface and water, and also providing for a higher water absorbing capacity of the additivated polystyrene material compared to the genuine polystyrene material.

Another subject of the invention is the use of a composition Z, as described before, for manufacturing an absorbent article of solid non-foamed or foamed polystyrene, wherein the absorbed material is preferably an aqueous liquid.

The composition Z is preferably a masterbatch MB or a Compound as defined before.

The absorbent article is preferably a film, a sheet or a container, e.g. a food tray, which is preferably in contact with water-containing food, e.g. meat, fish, vegetables or fruits.

The absorbed material is preferably water, blood or juice.

A further subject of the invention is a solid foamed or non-foamed polystyrene article comprising component B, component C, component D, component E and component P as defined above. In a preferred embodiment of the invention, said article is in contact with water-containing food, e.g. meat, fish, vegetables or fruits, and which article is preferably a film, a sheet or a container, e.g. a food tray. For the purposes of the invention, a hydrophilic solid non-foamed or foamed polystyrene is characterized by a static contact angle of from 5 to 81°, more preferably 30 to 80°, in particular 40 to 79°.

A further subject of the invention is a process for enhancing the hydrophilicity of solid non-foamed or foamed polystyrene by extruding, kneading, pressing or injection-molding a mixture of components B, C, D, E and P, as defined before.

Preferably, component B comprises 1, 2, 3, or 4, more preferably 1 or 2, even more preferably 1, polyethylene glycols.

Preferred polyethylene glycols are polyethylene glycols with a molar mass distribution $M_n$ of from 100 g/mol to 8,000,000 g/mol, preferably of from 150 g/mol to 1,000,000 g/mol, more preferably of from 160 g/mol to 100,000 g/mol, especially of from 180 g/mol to 35,000 g/mol, more especially of from 200 g/mol to 20,000 g/mol.

Preferred polyethylene glycols are polyethylene glycols with a pH value of from 5 to 7.

Preferred polyethylene glycols are polyethylene glycols with a viscosity at 20° C. (50% in aqueous solution) of from 50 to 14,000 mPa*s, polyethylene glycols with a viscosity at 20° C. (1% in aqueous solution) of from 4000 to 15,000 mPa*s, polyethylene glycols with a viscosity at 20° C. (2% in aqueous solution) of from 400 to 800 mPa*s and polyethylene glycols with a viscosity at 20° C. (5% in aqueous solution) of from 30 to 50 mPa*s.

Preferred polyethylene glycols are polyethylene glycols with a hydroxyl value of from 1 to 800 mg KOH/g, more preferably of from 3 to 700 mg KOH/g, even more preferably of from 4 to 650 mg KOH/g, especially of from 5 to 620 mg KOH/g, especially of from 25 to 610 mg KOH/g, or especially of from 530 to 600 mg KOH/g.

Preferred polyethylene glycols are linear polyethylene glycols with two free hydroxyl end groups.

Component C: Polyglycerolesters

Polyglycerols consist of glycerol units linked by an ether linkage. Preferred are diglycerols, triglycerols and tetraglycerols. Examples are alpha,alpha-diglycerol, alpha, beta-diglycerol, beta,beta-diglycerol

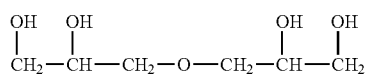

Formula alpha, alpha-diglycerol

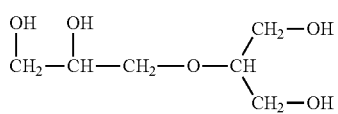

Formula alpha, beta-diglycerol

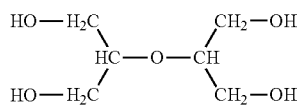

Formula beta, beta-diglycerol

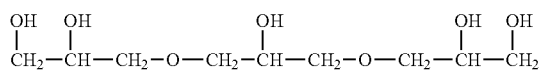

Formula triglycerol

Preferred for the purpose of the present invention are mono fatty acid esters of said polyglycerols. Expediently a mixture of di-, tri- and tetraglycerols esterified with one fatty acid is used. Minor amounts of penta- to octaglycerol esters may be present. Most preferred are polyglycerol-3-mono fatty acid esters. Polyglycerol-3 typically contains a minimum 80% di-, tri-, and tetraglycerol.

Preferred polyglyerolesters of fatty acids have a fatty acid with a chain length of from $C_4$ to $C_{24}$, more preferably of from $C_6$ to $C_{20}$, in particular of from $C_{12}$ to $C_{18}$, especially of from $C_{16}$ to $C_{18}$. Said fatty acids can be saturated or unsaturated. Preferred are saturated and mono-unsaturated fatty acids having a chain length as specified above.

Preferred polyglycerolesters of fatty acids are triglycerolesters of fatty acids.

Expediently, commercially available polyglyerolesters of fatty acids can be used for the purpose of the present invention. Those commercially available products are often mixtures containing more than one polyglyerolester of fatty acid, free fatty acids, and mono-, di-, tri- and tetraglycerolesters of fatty acids.

The triglycerolester content of component C is preferably of from 30 to 100% by weight, more preferably of from 50 to 99% by weight, in particular of from 70 to 98% by weight, based on the total weight of component C.

Most preferred are polyglycerol-3-monostearate, polyglycerol-3-monooleate, polyglycerol-3-monopalmitate, polyglycerol-3-monolaurate Typical examples are polyglycerol monolaurate

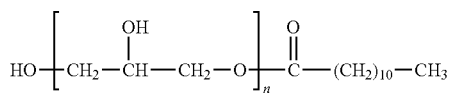

wherein n=2 or 3;
and polyglycerol monooleate

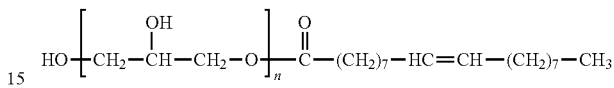

wherein n=2 or 3;
and polyglycerol monostearate

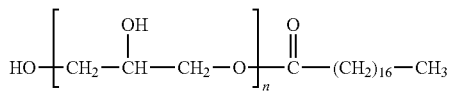

wherein n=2 or 3.

Preferably the acid number of component C is of below 5 mg KOH/g, more preferably of below 3 mg KOH/g, even more preferably of below 2 mg KOH/g. Preferably the iodine value of component B is of below 5 g $I_2$/100 g, more preferably the below 3 g $I_2$/100 g, even more preferably below 2 g $I_2$/100 g. Preferably the saponification number of component C is from 125 to 155 mg KOH/g.

Preferably, component D comprises 1, 2, 3 or 4, more preferably 1 or 2, even more preferably 1, earth alkali carbonate.

Preferred carbonates are calcium carbonates ($CaCO_3$, Calcit, or Aragonite), magnesium carbonates ($MgCO_3$, Magnesit) or calcium magnesium carbonates ($CaMg(CO_3)_2$, Dolomit).

Preferred carbonates are natural calcium carbonates, or synthetic precipitated calcium carbonate.

Expediently, commercially available calcium carbonates can be used for the purpose of the present invention. Those commercially available products are often containing contaminations in small amounts, e.g. Fe, Mn, Sr, Pb Cd, Cu, Zn Ions, $MgCO_3$, $Al_2O_3$, $Fe_2O_3$ or $SiO_2$.

The earth alkali carbonate is expediently used in powderous form, preferably in micronized form having a mean particle size of between 1 and 10 μm.

Preferably, component E comprises 1, 2, 3 or 4 phyllosilicates, more preferably 1 or 2, even more preferably 1, phyllosilicates. Phyllosilicates are defined as sheet silicates forming parallel sheets of silicate tetrahedra with a Si: O ratio of 2:5 (Nickel-Strunz classification).

Preferred are phyllosilicates of the clay mineral group comprising halloysite, kaolinite, illite, montmorillonite, vermiculite, talc, palygorskite and pyrophyllite, more preferably $Mg_3Si_4O_{10}(OH)_2$(Talc).

Expediently, commercially available talc can be used for the purpose of the present invention. Those commercially available products are often containing contaminations in small amounts, e.g. Fe, Mn, Ti, Ni, Sr, Pb Cd, Cu, Zn, Mn, Na, K, Cl Ions, $MgCO_3$, $Al_2O_3$, $Fe_2O_3$, FeO, MgO, $SiO_2$.

The phyllosilicates are expediently used in powderous form, preferably in micronized form having a mean particle size of between 1 and 10 μm.

Preferably, component P comprises 1, 2, 3, or 4, more preferably 1 or 2, even more preferably 1, polystyrenes.

Polystyrene can be a styrene homopolymer, an alkylstyrene homopolymer, preferably a $C_1$-$C_4$-alkylstyrene homopolymer, for example α-methylstyrene homopolymer; a styrene copolymer, especially a high impact polystyrene (HIPS). High impact polystyrenes (HIPS) are generally prepared by polymerization by grafting mixtures of styrene and optionally of one or more copolymerizable vinyl monomers, preferably mixtures of styrene, methylstyrene, ethylstyrene, butylstyrene, halostyrenes, vinylalkylbenzenes, such as vinyltoluene, vinylxylene, acrylonitrile, methacrylonitrile, lower alkyl esters of methacrylic acid, in the presence of a rubbery polymer trunk comprising copolymers chosen from polybutadiene, polyisoprene, rubbery styrene-diene copolymers, acrylic rubber, nitrile rubber and olefinic rubbers, such as propylene diene monomer rubber (PDM) and propylene rubber (PR). In the high impact polystyrene, the rubbery polymer trunk normally constitutes from 5 to 80% by weight, preferably 5 to 50% by weight, of the total weight of the grafted polymer.

In addition, it is also possible to use styrene-butadiene-styrene (SBS) copolymers and synthetic butyl rubbers (SBR).

It is also possible to use mixtures or alloys of the above styrene polymers.

The preferred density of component P is of from 1.0 to 1.1 g/cm$^3$, more preferably of from 1.02 to 1.06 g/cm$^3$, even more preferably of from 1.03 to 1.05 g/cm$^3$.

Preferred polystyrenes are polystyrenes with a MFR at 200° C./5 kg according to ISO 1133 of from 0.1 to 300 g/10 min, more preferably of from 1 to 200 g/10 min, even more preferably of from 5 to 100 g/10 min, especially of from 10 to 50 g/10 min, more especially of from 15 to 35 g/10 min, in particular of from 20 to 30 g/10 min.

The composition Z expediently comprises of from 0.06 to 90% by weight of the sum of the components B,C,D and E, preferably Z comprises of from 0.5 to 80% by weight of the sum of the components B,C,D and E, more preferably Z comprises of from 1.0 to 70% by weight of the sum of the components B,C,D and E, even more preferably Z comprises of from 1.25 to 50% by weight of the sum of the components B, C, D and E, especially Z comprises of from 1.5 to 25% by weight of the sum of the components B, C, D and E, with the % by weight being based on the total weight of the composition Z.

The composition Z preferably comprises the component B and component C with a weight ratio of component B and component C of from 0.1 to 10.0, preferably of from 0.2 to 5.0, more preferably of from 0.3 to 1.0, even more preferably of from 0.4 to 0.8, especially of from 0.5 to 0.6.

If the composition Z is a masterbatch MB, Z expediently comprises
  0.2 to 20% by weight of component B,
  0.4 to 40% by weight of component C,
  0.2 to 20% by weight of component D,
  0.1 to 10% by weight of component E,
  10 to 99.1% by weight of component P,
with the weight % being based on the total weight of composition Z.

If the composition Z is a masterbatch MB, Z expediently comprises
  1.5 to 20% by weight of component B,
  3 to 40% by weight of component C;
  1.5 to 20% by weight of component D,
  0.75 to 10% by weight of component E;
  10 to 93.25% by weight of component P;

preferably, the composition Z as a Masterbatch MB comprises
  3 to 15% by weight of component B,
  6 to 30% by weight of component C;
  3 to 15% by weight of component D,
  1.5 to 7.5% by weight of component E;
  32.5 to 86.5% by weight of component P.

If the composition Z is a Compound, Z expediently comprises
  0.0167 to 1.47% by weight of component B,
  0.0333 to 2.94% by weight of component C;
  0.0167 to 1.47% by weight of component D,
  0.00835 to 0.735% by weight of component E;
  93.385 to 99.92495% by weight of component P;
preferably, the composition Z as a Compound comprises
  0.07 to 1% by weight of component B,
  0.14 to 2% by weight of component C;
  0.07 to 1% by weight of component D,
  0.035 to 0.5% by weight of component E;
  95.5 to 99.69% by weight of component P;
more preferably, the composition Z as a Compound comprises
  0.25 to 0.75% by weight of component B,
  0.5 to 1.5% by weight of component C;
  0.25 to 0.75% by weight of component D,
  0.125 to 0.375% by weight of component E;
  96.63 to 98.88% by weight of component P;
even more preferably, the composition Z as a Compound comprises
  0.3 to 0.7% by weight of component B,
  0.6 to 1.4% by weight of component C;
  0.3 to 0.7% by weight of component D,
  0.15 to 0.35% by weight of component E;
  96.85 to 98.65% by weight of component P;
especially, the composition Z as a Compound comprises
  0.4 to 0.5% by weight of component B,
  0.8 to 1% by weight of component C;
  0.4 to 0.5% by weight of component D,
  0.2 to 0.25% by weight of component E;
  97.75 to 98.2% by weight of component P;
the % by weight being in each case based on the total weight of the composition Z.

The composition Z can contain further substances, preferably
  colorants, with organic and inorganic dyes and pigments being possible as colorants; as organic pigments, preference is given to using azo or diazo pigments, coated azo or diazo pigments or polycyclic pigments; preferred polycyclic pigments are diketopyrrolopyrrole, phthalocyanine, quinacridone, perylene, dioxazine, anthraquinone, thioindigo, diaryl or quinophthalone pigments; as inorganic pigments, preference is given to using metal oxides, mixed oxides, aluminium sulphates, chromates, metal powders, pearl-effect pigments (mica), luminous pigments, titanium oxides, cadmium-lead pigments, iron oxides, carbon black, silicates (other than component E), nickel titanates, cobalt pigments or chromium oxides suitable for pigmentation;
  dispersing aids, preferred dispersants are polar acid esters of $C_{10}$-$C_{30}$ alcohols;
  fillers (other than component D and E) such as silica, zeolites, silicates, e.g. aluminium silicates, sodium silicate, calcium silicates
  auxiliaries, preferably metal soaps, foaming agents, nucleating agents (other than component D and E), peroxides;

alkylamines, ethoxylated alkylamines, glyceryl esters or mixtures (blends) thereof;

UV absorbers and hindered amine light stabilizer (HALS) compounds, slip agents, antifogging agents, anticondensation agents and/or suspension stabilizers, flame retardants; antioxidants or other customary plastics additives; ionic liquids;

or mixtures of these.

Said further substances are meant to be different from any of the components B, C, D, E and P.

These further substances are expediently present from 0 to 60%, preferably 0.01 to 40%, more preferably 0.1 to 30%, even more preferably 1 to 20%, especially 2 to 10% by weight, based on the total weight of the composition Z. In the case that the polystyrene is a foamed polystyrene, a preferred further substance is a chemical foaming agent.

The composition Z can be produced by physically mixing the components B, C, D, E and P and optionally any of the further substances with one another.

The mixing of the components can occur in one step or in a plurality of steps.

As mixing apparatuses for physical mixing, it is possible to use the mixing apparatuses customary in the plastics industry, preferably an apparatus selected from the group consisting of extruders, kneaders, presses, injection-moulding machines and blade mixers. When the composition Z is a masterbatch MB, the mixing apparatuses are preferably extruders, kneaders and/or blade mixers. When the composition Z is a compound, the mixing apparatuses are preferably extruders, presses and injection-moulding machines, particularly preferably extruders.

Mixing preferably occurs continuously or batchwise, particularly preferably continuously, in the case of a masterbatch MB preferably by extrusion or kneading, particularly preferably by extrusion, and in the case of a compound preferably by extrusion or injection moulding or pressing, particularly preferably by extrusion.

Mixing is preferably carried out at a temperature of from 80 to 260° C., more preferably of from 120 to 250° C., even more preferably of from 150 to 230° C., especially of from 180 to 220° C.

The mixing time is preferably of from 5 sec to 10 h.

The mixing time in the case of continuous mixing is preferably of from 5 sec to 1 h, more preferably of from 10 sec to 15 min.

The mixing time in the case of batchwise mixing is preferably of from 1 min to 10 h, more preferably of from 2 min to 8 h, in particular of from 2 min to 5 h, especially of from 2 min to 1 h, particularly preferably of from 2 to 15 min.

In the case of Compounds, the components B, C, D, E and P are preferably mixed in the form of a masterbatch MB with polystyrene P. Furthermore, a premix of the masterbatch MB with pelletized polystyrene is preferably used for physical mixing.

The compositions Z, both in the form of a masterbatch MB or in the form of a compound, are surprisingly characterized by a low static contact angle.

For the production of foamed polystyrene articles, e.g. food trays, polystyrene is extruded with foaming agents. The foaming agents can be either a physical foaming agent, e.g. a gas like $CO_2$, $N_2$, isopentane, hydrofluorocarbons, or a chemical foaming agent which decomposes in the melted polymer during processing liberating a gas, e.g. $CO_2$ or $N_2$. In both processes the gas has to be thoroughly dispersed and dissolved in the polymer melt under pressure in the extruder barrel. When the melt exits the extruder through the die, the pressure drops and the gas expands the melt creating a cellular structure in the polymer. Foam extruded polystyrene articles produced in the so called direct gassed extrusion can achieve foam densities of from 15 $kg/m^3$ to 500 $kg/m^3$.

Test Methods:

Determination of the molar mass distribution $M_n$ is done by gel permeation chromatography (GPC) according to DIN 55672.

Determination of the viscosity at 20° C. of a 1%, 2%, 5% or 50% aqueous solution in accordance with ISO 6388.

Determination of the density in accordance with ISO 1183.

Determination of the MFR at 200° C. and 5 kg weight in accordance with ISO 1133.

Determination of the tensile modulus in accordance with ISO 527-1/-2.

Determination of the static contact angle is carried out by carefully putting a drop of distilled water with a defined volume on the surface of the polystyrene sheet. The angle formed between the solid/liquid interface and the liquid/vapor interface is referred to as the static contact angle Theta. After 5s of resting time, a photo is taken and the static contact angle is determined with an image processing software by looking at the profile of the drop and measuring two-dimensionally the angle formed between the solid and the drop profile with the vertex at the three-phase line as shown in the graphic (FIG. 1).

Substances used:

Component B: Polyethylene glycol, with a hydroxyl value of from 28 to 39 mg KOH/g, and an average molecular weight of 3,350 g/mol;

Component C: Polyglycerol(3)monostearate, with an acid number of from 0 to 2 mg KOH/g, a iodine number of from 0 to 2 mg $gI_2$/100 g and a saponification number of about 135 mg KOH/g;

Component D: micronized calcium carbonate, with a statistic mean diameter of 5.5 μm;

Component E: talc, mg-silicate, CAS 14807-96-6 with a statistic mean diameter of 6 μm;

Component P1: general purpose polystyrene homopolymer having an MFR at 200° C./5 kg of from 20 to 28 g/10 min and a tensile modulus of from 3000 to 3400 MPa.

Component P2: high impact, rubber modified polystyrene having an MFR at 200° C./5 kg of from 4.0 to 6.0 g/10 min and a tensile modulus of from 1600 to 2000 MPa.

Component A (Comparison): sodium $C_{12}$-$C_{18}$-alkyl sulphonate.

In the following examples percentages are weight percent based on the total weight of the mixture or the article, unless indicated otherwise; parts are parts by weight; "Comp." means Comparative Example.

COMPARATIVE EXAMPLE 1

Representing the Teaching of EP 2 289 994 A2

15 parts of component A, 15 parts of component D, 7.5 parts of component E and 62.5 parts of component P1 are homogenized together on a twin-screw extruder (temperature of the extruder: 220 to 230° C.). A masterbatch MB1 is obtained.

COMPARATIVE EXAMPLE 2

15 parts of component C, 15 parts of component D, 7.5 parts of component E and 62.5 parts of component P1 are homogenized together on a twin-screw extruder (temperature of the extruder: 220 to 230° C.). A masterbatch MB2 is obtained.

COMPARATIVE EXAMPLE 4

15 parts of component B, 15 parts of component D, 7.5 parts of component E and 62.5 parts of component P1 are homogenized together on a twin-screw extruder (temperature of the extruder: 220 to 230° C.). A masterbatch MB4 is obtained.

EXAMPLE 5

5 parts of component B, 10 parts of component C, 15 parts of component D, 7.5 parts of component E and 62.5 part of component P1 are homogenized together on a twin-screw extruder (temperature of the extruder: 220 to 230° C.). A masterbatch MB5 is obtained.

EXAMPLE 7

5 parts of component B, 10 parts of component C, 15 parts of component D, 7.5 parts of component E, 32.5 parts of component P1 and 30 parts of component
P2 are homogenized together on a twin-screw extruder (temperature of the extruder: 220 to 230° C.). A masterbatch MB7 is obtained.

COMPARISON EXAMPLE 9

Representing the Teaching of EP 2 289 994 A2

21 parts of component A, 20 parts of component D, 5.0 parts of component E and 34 parts of component P1 and 20 parts of component P2 are homogenized together on a twin-screw extruder (temperature of the extruder: 220 to 230° C.). A masterbatch MB9 is obtained.

| Example | Masterbatch Designation | Component [% by weight] | | | | | | |
|---|---|---|---|---|---|---|---|---|
| | | A | B | C | D | E | P1 | P2 |
| Comp. 1 | MB1 | 15 | 0 | 0 | 15 | 7.5 | 62.5 | 0 |
| Comp. 2 | MB2 | 0 | 0 | 15 | 15 | 7.5 | 62.5 | 0 |
| Comp. 4 | MB4 | 0 | 15 | 0 | 15 | 7.5 | 62.5 | 0 |
| 5 | MB5 | 0 | 5 | 10 | 15 | 7.5 | 62.5 | 0 |
| 7 | MB7 | 0 | 5 | 10 | 15 | 7.5 | 32.5 | 30 |
| Comp. 9 | MB9 | 21 | 0 | 0 | 20 | 5 | 34 | 20 |

COMPARISON EXAMPLE 21

10 parts of a masterbatch MB1 produced as described in Comparison Example 1 were homogenized and mixed with 90 parts of component P1 on a flat film extruder (Collin). With a rotational speed of 100 rpm and a temperature of 220-230° C. a flat film FF21 with a thickness of 100 μm was obtained.

COMPARISON EXAMPLE 22

10 parts of a masterbatch MB2 produced as described in Comparison Example 2 were homogenized and mixed with 90 parts of component P1 on a flat film extruder (Collin). With a rotational speed of 100 rpm and a temperature of 220-230° C. a flat film FF22 with a thickness of 100 μm was obtained.

COMPARISON EXAMPLE 24

10 parts of a masterbatch MB4 produced as described in Example 4 were homogenized and mixed with 90 parts of component P1 on a flat film extruder (Collin). With a rotational speed of 100 rpm and a temperature of 220-230° C. a flat film FF24 with a thickness of 100 μm was obtained.

EXAMPLE 25

10 parts of a masterbatch MB5 produced as described in Example 5 were homogenized and mixed with 90 parts of component P1 on a flat film extruder (Collin). With a rotational speed of 100 rpm and a temperature of 220-230° C. a flat film FF25 with a thickness of 100 μm was obtained.

EXAMPLE 27

10 parts of a masterbatch MB7 produced as described in Example 7 were homogenized and mixed with 90 parts of component P1 on a flat film extruder (Collin). With a rotational speed of 100 rpm and a temperature of 220-230° C. a flat film FF27 with a thickness of 100 μm was obtained.

COMPARISON EXAMPLE 29

7.14 parts of a masterbatch MB9 produced as described in Comparison Example 9 were homogenized and mixed with 52.86 parts of component P1 and 40 parts of component P2 on a flat film extruder (Collin). With a rotational speed of 100 rpm and a temperature of 220-230° C. a flat film FF29 with a thickness of 100 μm was obtained.

TABLE 2

| Example | Flat Film Designation | Static contact angle [°] |
|---|---|---|
| Comp. 21 | FF21 | 89 |
| Comp. 22 | FF22 | 82 |
| Comp. 24 | FF24 | 82 |
| 25 | FF25 | 78 |
| 27 | FF27 | 79 |
| Comp. 29 | FF29 | 89 |

The invention claimed is:
1. A composition Z comprising a component B, a component C, a component D, a component E and a component P wherein
    the component B is a polyethylene glycol,
    the component C is a polyglycerol ester,
    the component D is an earth alkali carbonate,
    the component E is a phyllosilicate,
    and the component P is a polystyrene or a mixture of polystyrenes.
2. The composition Z as claimed in claim 1, comprising of from 0.06 to 90% by weight of the sum of the components B C, D and E, with the % by weight being based on the total weight of the composition Z.
3. The composition Z as claimed in claim 1, wherein the composition Z comprises of from 1.25 to 50% by weight of the sum of the components B, C, D, and E, with the % by weight being based on the total weight of the composition Z.
4. The composition Z as claimed in claim 1, wherein the composition Z comprises the component B and component C in a weight ratio of component B to component C of from 0.1 to 10.0.

5. The composition Z as claimed in claim 1, wherein the composition Z comprises the component B and component C in a weight ratio of component B to component C of from 0.3 to 1.0.

6. The composition Z as claimed in claim 1, herein the composition Z is a masterbatch MB and comprises
- 0.2 to 20% by weight of component B,
- 0.4 to 40% by weight of component C,
- 0.2 to 20% by weight of component D,
- 0.1 to 10% by weight of component E, and
- 10 to 99.1% by weight of component P,
with the weight % being based on the total weight of composition Z.

7. The composition Z as claimed in claim 1, wherein the composition Z is a masterbatch MB and comprises
- 1.5 to 20% by weight of component B,
- 3 to 40% by weight of component C,
- 1.5 to 20% by weight of component D,
- 0.75 to 10% by weight of component E, and
- 10 to 93.25% by weight of component P,
with the weight % being based on the total weight of composition Z.

8. The composition Z as claimed in claim 1, wherein the composition Z is a Compound and comprises
- 0.0167 to 1.47% by weight of component B,
- 0.0333 to 2.94% by weight of component C,
- 0.0167 to 1.47% by weight of component D,
- 0.00835 to 0.735% by weight of component E, and
- 93.385 to 99.92495% by weight of component P,
with the weight % being based on the total weight of composition Z.

9. The composition Z as claimed in claim 1, wherein component P is a styrene homopolymer, an alkylstyrene homopolymer or a styrene copolymer.

10. The composition Z as claimed in claim 9, wherein the styrene copolymer is a high impact polystyrene, a styrene-butadiene-styrene or a synthetic butyl rubber.

11. The composition Z as claimed in claim 1, wherein component C is a polyglycerol fatty acid ester.

12. A process for preparing a composition Z comprising the step of mixing together components B, C, D, E and P wherein
- the component B is a polyethylene glycol,
- the component C is a polyglycenal ester,
- the component D is an earth alkali carbonate,
- the component E is a phyllosilicate,
- and the component P is a polystyrene or a mixture of polystyrenes.

13. An absorbent article of solid non-foamed or foamed polystyrene comprising a composition Z as claimed in claim 1.

14. A solid foamed or non-foamed polystyrene article comprising a composition Z as claimed in claim 1.

15. The article as claimed in claim 14, wherein the article is a film, a sheet or a container.

16. The article as claimed in claim 14, wherein the article is a food tray.

* * * * *